US007324962B1

(12) United States Patent
Valliani et al.

(10) Patent No.: US 7,324,962 B1
(45) Date of Patent: Jan. 29, 2008

(54) NETWORK FOR ALLIANCE MARKETING

(75) Inventors: Aziz Valliani, Fremont, CA (US); Ari Kapur, San Jose, CA (US); Dinesh Joseph Fernandopulle, San Jose, CA (US); Ananda Rakhit, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 656 days.

(21) Appl. No.: 09/899,369

(22) Filed: Jul. 2, 2001

Related U.S. Application Data

(60) Provisional application No. 60/280,565, filed on Mar. 29, 2001.

(51) Int. Cl.
*G06Q 30/00* (2006.01)
(52) U.S. Cl. .................................................. 705/26
(58) Field of Classification Search .................. 705/26, 705/27
See application file for complete search history.

(56) References Cited

U.S. PATENT DOCUMENTS 5,687,322 A * 11/1997 Deaton et al. ................ 705/14
6,578,012 B1 * 6/2003 Storey .......................... 705/14
6,694,300 B1 * 2/2004 Walker et al. ................ 705/14
6,741,968 B2 * 5/2004 Jacoves et al. ............... 705/14

OTHER PUBLICATIONS

As Children's Taste in Premiums Sharpens, Kid Cereal Marketers Upscale Offers, Jul. 1997, Youth Market Alert, V 9, n 7, P1+.*
Debelak, Don. Marketing Plan: Develop a Comprehensive Sales and Marketing Plan for Your Business, Service, or Product. Adams Streetwise. 2000. p. 138.*

* cited by examiner

*Primary Examiner*—James A. Kramer
*Assistant Examiner*—Jason Borlinghaus
(74) *Attorney, Agent, or Firm*—Fay Kaplun & Marcin, LLP

(57) ABSTRACT

A method for cross marketing between companies. A first company conditions the grant of a discount for a second product at a second company on a purchase of a first product at the first company. The second company offers the second product for sale and stands ready to accept the discount on this second product as granted by the first company. The consumer may be notified of the discount. A credit may be deposited into an account of the consumer as an amount of property, a percentage of revenue, money, or some combination. Cumulative discounts may be aggregated on the purchase of a second product. A credit to an account benefiting the second company may be made in compensation for accepting the discount. The method may be used by departments within a company.

22 Claims, 8 Drawing Sheets

NETWORK FOR ALLIANCE MARKETING

BENEFIT APPLICATIONS

This application claims the benefit of the following application:

U.S. Provisional Patent Application No. 60/280,565, entitled, "Alliance Marketing," filed Mar. 29, 2001, naming Ari Kapur, Aziz Valliani, Ananda Rahkit and Tony C. Hsiao as inventors, with and under an obligation of assignment to Crossvue, Inc. of San Jose, Calif.

U.S. Provisional Patent Application No. 60/280,565 is incorporated by reference herein.

This invention relates to marketing between companies.

(The drawings are not to scale.)

DESCRIPTION OF THE INVENTION

Figure 1:
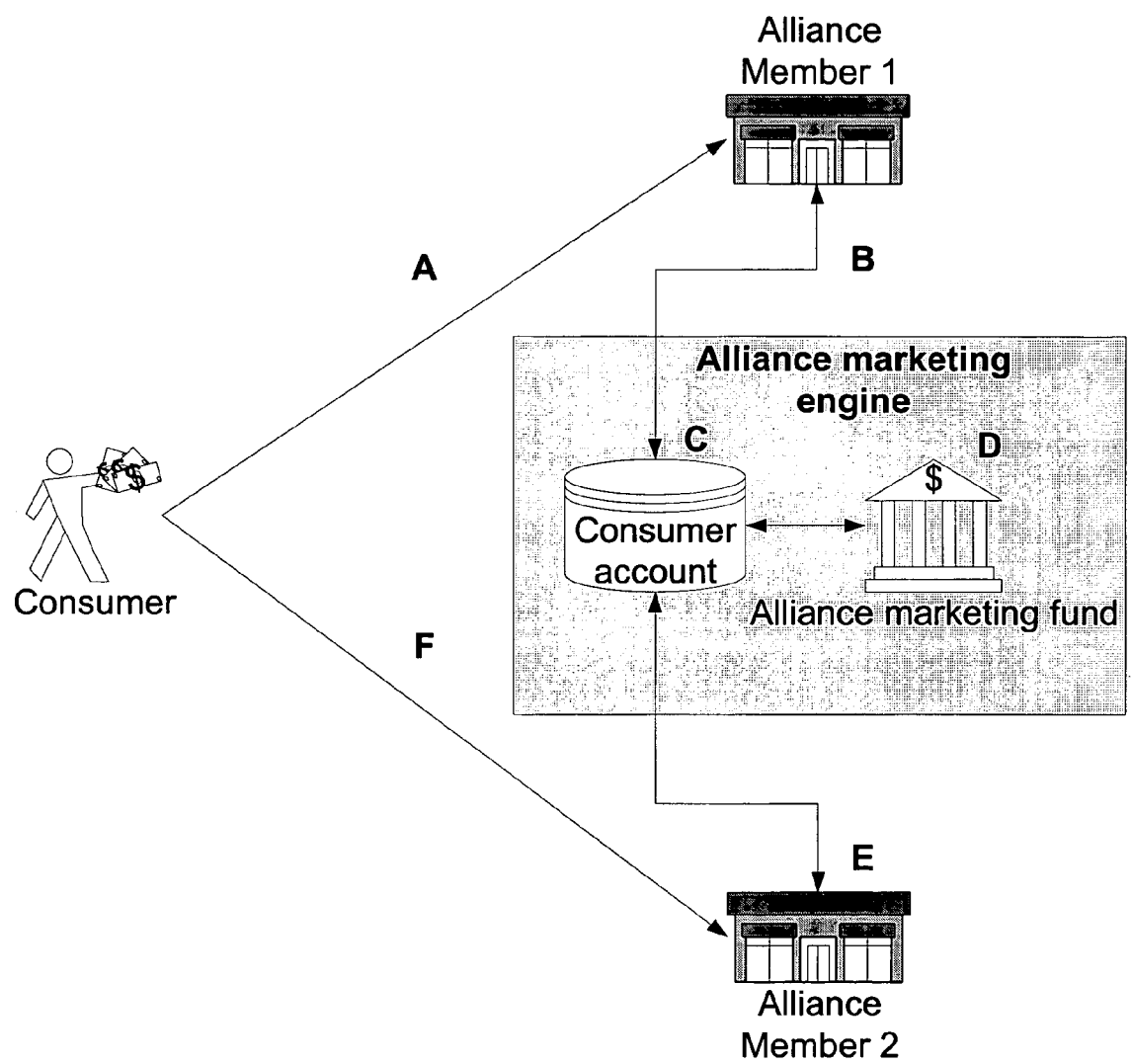
FIG. 1 depicts a typical consumer flow between two alliance members (Alliance Member 1 and Alliance Member 2).

An alliance marketing network provides participating companies with the ability to cross promote each other. Although an alliance marketing network may be comprised of up to n companies, n>=2, let us assume for the following example that an alliance marketing network is comprised of only two members and that Alliance Member One ($AM_1$) specializes in selling music, specifically compact discs, to a broad demographic and Alliance Member Two ($AM_2$) specializes in providing apparel tailored to consumers who are 18 to 30 years old but relatively affluent.

A consumer enters an outlet belonging to $AM_2$ and is informed that with the purchase of qualifying apparel, he/she will receive promotional points that may redeemed for free merchandise at an outlet belonging to $AM_1$. This information may be disseminated through a number of means including (but not limited to) customer experience representatives conducting entrance intercepts or strategically placed in-store signage. The consumer decides to opt in for the offer and purchases a piece of apparel that is on promotion. Regardless of the currency used, a consumer account then receives a credit, in the form of points that may be redeemed at $AM_1$ for free merchandise.

For each qualifying transaction occurring at an $AM_2$ outlet, $AM_2$ contributes a predetermined dollar amount to a alliance-marketing fund. These contributions are made by $AM_2$ to defray $AM_1$'s cost of dispensing free merchandise. This alliance-marketing fund, as part of an alliance-marketing network, may be automatically reconciled and disbursed to participating companies (per agreed upon terms) at regular time intervals (e.g., once per month).

There are instantaneous benefits to such an alliance marketing network for both $AM_1$ and $AM_2$. For $AM_2$, one benefit is the increased revenue through incremental sales. Consumers, in order to take advantage of promotional offers, purchase apparel items they would potentially purchase elsewhere, thereby increasing consumer share of wallet and consumer loyalty for $AM_2$. Additionally, tying these lower-cost promotions to slow-moving merchandise eliminates the need to steeply discount less popular product. This in turn holds margins steady, thereby decreasing bottom-line profit volatility.

There are also benefits for $AM_1$ as well. As consumers begin to frequent $AM_1$'s stores with the intention of redeeming their credits for free merchandise, they will likely purchase additional items as well, thereby increasing $AM_1$'s revenue through incremental sales. These promotions also serve to decrease new consumer acquisition costs for $AM_1$ as consumers who have not previously shopped there, come in to redeem their credits. Increased share of wallet among existing consumers also occurs as they begin to shop more frequently due to these promotions. As an additional benefit, $AM_1$ also receives the monetary contributions made by $AM_2$ to an alliance marketing fund. $AM_1$ receives these contributions (Cost Recovery) as a cost offset for free merchandise they are dispensing.

The above example assumes that $AM_2$ is driving consumers to $AM_1$ unilaterally. However, an alliance-marketing network does not preclude reciprocal relationships. Given the operational infrastructure present in such an alliance marketing network, $AM_1$ may also drive consumers back to $AM_2$ if an agreed upon relationship calls for it. In the case of a bilateral relationship, both $AM_1$ and $AM_2$ contribute predetermined dollar amounts to an alliance marketing fund to defray each other's cost of dispensing free merchandise. As with the unilateral example, this alliance marketing fund, as part of an alliance marketing network, is automatically reconciled and disbursed to participating companies at regular time intervals (e.g., once per month). The above example also assumes that there are only two companies in an alliance marketing network. Given the infrastructure of an alliance marketing network, this example is expandable to n companies. There is no upper limit to the number of companies participating in an alliance-marketing network.

The benefits and cost to companies participating in a bilateral alliance marketing network may be expressed mathematically through a series of example equations. For the bilateral alliance-marketing network example described above, Equation 1 denotes the incremental revenue to $AM_1$ as a result of participating in an alliance marketing network and may be expressed as follows $$IncrementalRevenue = \left[\left(\sum_{j=1}^{m} p_{1j}q_{1j}\right)a_1 + \sum_{k=1}^{n} p_{1k}q_{1k}\right] \quad (1)$$

where:
- $p_{1j}$ is the price charged by $AM_1$ for Product j (straight sale)
- $q_{1j}$ is the quantity sold of Product j by $AM_1$ (straight sale)
- $a_1$ is the % discount $AM_1$ would have otherwise given a consumer if they were not part of an alliance marketing network $p_{1k}$ the price charged by $AM_1$ for Product k (incremental referral sale)

$q_{1k}$ is the quantity sold of Product k by $AM_1$ (incremental referral sale)

(A straight sale is a sale to the consumer without involving the alliance network.)

The first piece of Equation 1

$$\left(\sum_{j=1}^{m} p_{1j} q_{1j}\right) a_1$$

denotes the sum total of discounts on purchases $AM_1$ would have otherwise given if it were not part of an alliance marketing network. In other words, an alliance marketing network allows $AM_1$ to reclaim revenue that would have otherwise been provided to the consumer in the form of a percentage discount on merchandise.

The second piece of Equation 1, $$\sum_{k=1}^{n} p_{1k} q_{1k},$$

denotes the sum total of revenue realized as a result of incremental referral sales. In other words, an alliance marketing network will drive incremental consumers to $AM_1$ with the intention of redeeming awarded points. It is to be assumed that a certain percentage of these redemptions will be accompanied by incremental sales, thereby increasing revenue for $AM_1$.

Equation 2 denotes the cost recovery for redeemed merchandise piece of an alliance marketing network and, as an example, may be the following:

$$CostRecovery = \left[\sum_{j=1}^{m} p_{2j} q_{2j} x_{2j} + \sum_{k=1}^{n} p_{2k} q_{2k} x_{2k}\right] \quad (2)$$

where:

$p_{2j}$ is the price charged by $AM_2$ for Product j (straight sale)

$q_{2j}$ is the quantity sold of Product j by $AM_2$ (straight sale)

$x_{2j}$ is the percentage of straight sales contributed to alliance marketing fund by $AM_2$ $p_{2k}$ is the price charged by $AM_2$ for Product k (incremental referral sale)

$q_{2k}$ is the quantity sold of Product k by $AM_2$ (incremental referral sale)

$x_{2k}$ is the percentage of incremental referral sales contributed to alliance marketing program by $AM_2$ The first piece of Equation 2

$$\sum_{j=1}^{m} p_{2j} q_{2j} x_{2j}$$

denotes the sum total of contributions made by $AM_2$ as a result of straight sales of promoted items made in outlets belonging to $AM_2$. In other words, $AM_2$ contributes a percentage of their straight sales of promoted items to an alliance marketing fund. These contributions are reclaimed by $AM_1$ as consumers redeem points awarded for free merchandise in outlets belonging to $AM_1$.

The second piece of Equation 2, $$\sum_{k=1}^{n} p_{2k} q_{2k} x_{2k},$$

denotes the sum total of contributions made by $AM_2$ to an alliance marketing fund as a result of incremental referral sales made in outlets belonging to $AM_2$. An alliance-marketing network may also drive incremental consumers to $AM_2$ with the intention of redeeming awarded points. It is assumed that a certain percentage of these redemptions will be accompanied by incremental sales for which $AM_2$ also contributes to an alliance marketing fund. Once again, these contributions may be reclaimed by $AM_1$ as consumers redeem points awarded for free merchandise in outlets belonging to $AM_1$.

The third equation denotes the cost piece to $AM_1$ of participating in an alliance marketing network and may be represented by the following:

$$Cost = \left[\sum_{j=1}^{m} p_{1j} q_{1j} x_{1j} + \sum_{k=1}^{n} p_{1k} q_{1k} x_{1k} + \left(\frac{\sum_{j=1}^{m} p_{2j} q_{2j}}{z_1}\right) c_1 y_1\right] \quad (3)$$

where:

$p_{1j}$ is the price charged by $AM_1$ for Product j (straight sale)

is the quantity sold of Product j by $AM_1$ (straight sale)

$x_{1j}$ is the percentage of straight sales contributed to an alliance marketing program by $AM_1$ $p_{1k}$ is the price charged by $AM_1$ for Product k (incremental referral sale)

$q_{1k}$ is the quantity sold of Product k by $AM_1$ (incremental referral sale)

$x_{1k}$ is the percentage of incremental referral sales contributed to an alliance marketing program by $AM_1$ $z_1$ is a conversion factor ($ to redeemable points) for $AM_1$ $c_1$ is an average cost for a product redeemed at $AM_1$ $y_1$ is the percentage of total points awarded redeemed at $AM_1$ The first piece of Equation 3, $$\sum_{j=1}^{m} p_{1j} q_{1j} x_{1j},$$

denotes the sum total of contributions made by $AM_1$ to an alliance marketing fund as a result of straight sales of promoted items made in outlets belonging to $AM_1$. In other words, $AM_1$ contributes a percentage of their straight sales of promoted items to an alliance marketing fund. These contributions are reclaimed by $AM_2$ as consumers redeem points awarded for free merchandise in outlets belonging to $AM_2$.

The second piece of Equation 3, $$\sum_{k=1}^{n} p_{1k}q_{1k}x_{1k},$$

denotes the sum total of contributions made by $AM_1$ to an alliance-marketing fund as a result of incremental referral sales made in outlets belonging to $AM_1$. An alliance-marketing network may also drive incremental consumers to $AM_1$ with the intention of redeeming awarded points. It is assumed that a certain percentage of these redemptions will be accompanied by incremental sales for which $AM_1$ also contributes to an alliance marketing fund. Once again, these contributions are reclaimed by $AM_2$ as consumers redeem points awarded for free merchandise in outlets belonging to $AM_2$.

The third piece of Equation 3, $$\left(\frac{\sum_{j=1}^{m} p_{2j}q_{2j}}{z_1}\right) c_1 y_1,$$

denotes the sum cost of merchandise redeemed for points by consumers at outlets belonging to $AM_1$.

The combination of Equations 1, 2, and 3 is the net benefit to $AM_1$ and may be represented as follows:

$$NetBenefit = \left[\left(\sum_{j=1}^{m} p_{1j}q_{1j}\right)a_1 + \sum_{k=1}^{n} p_{1k}q_{1k} + \sum_{j=1}^{m} p_{2j}q_{2j}x_{2j} + \sum_{k=1}^{n} p_{2k}q_{2k}x_{2k} - \left(\sum_{j=1}^{m} p_{1j}q_{1j}x_{1j} + \sum_{k=1}^{n} p_{1k}q_{1k}x_{1k} + \left(\frac{\sum_{j=1}^{m} p_{2j}q_{2j}}{z_1}\right)c_1 y_1\right)\right] \quad (4)$$

Some elements in the above equation may minimally, if at all, impact alliances. For example, in the case of a 1:1 conversion rate between dollars and points, the element $z_1$ will equal one. As another example, if one hundred percent of the points awarded are redeemed, then the element $y_1$ will also equal one.

There also exists the possibility that third parties such as credit-card processors or product manufacturers would also wish to participate in these alliances. In this instance, a third-party could potentially subsidize the promotions that are being executed. An alliance-marketing network is able to accommodate this type of relationship, as well as those only between companies.

Once alliance members negotiate and determine the parameters of an alliance marketing network, alliance members may enter those negotiated parameters into an alliance-marketing engine. An alliance-marketing engine is a logical entity that may be implemented using either a centralized architecture or a distributed architecture. An alliance-marketing engine includes of an alliance-marketing database, a campaign manager, and an algorithm that automatically generates business rules based on the parameters input by alliance members. An alliance-marketing engine may allow these parameters to be input into a database via a standard Web-based interface that uses drop down menus and radio buttons. Example parameters available for input by alliance members include but are not limited to the following:

The form of payment established by alliance members (e.g. dollars, barter, points, etc.)

The contributions to be made by alliance members for straight and incremental referral sales Any geographic provisions to the agreement (e.g. $AM_1$ may be willing to make a higher contribution to an alliance marketing fund for consumers referred to them from California as opposed to consumers referred to them from New Mexico)

Any temporal specifications to the agreement (e.g. length of contractual agreement, promotion, etc.)

Any product specific conditions in the agreement (e.g. $AM_1$ may be willing to make a higher contribution to an alliance marketing fund for people referred to them who purchase specific products)

Upon the input of these parameters, say, by alliance members, an alliance-marketing engine, using an algorithm transforms these parameters into general business rules that delineate the relationship between alliance members. Once these parameters are transformed into business rules, alliance members then input the specific promotional campaigns they wish to run into a campaign management module that is a component of an alliance marketing engine. This is accomplished via a standard Web-based interface that utilizes drop down menus. Information entered pertaining to a specific promotional campaign includes but is not limited to 1) the time span of the promotion, 2) the products to be promoted, and 3) any other limitations on the promotional campaigns agreed upon by alliance members.

An alliance-marketing engine also allows for the relationship between alliance members to be both managed and modified. For instance, after a promotional campaign has concluded, alliance members may choose to modify the parameters of their alliance marketing network. These changes to an alliance marketing network may be made by representatives of alliance members in real time utilizing a Web-based interface. Subsequent promotional campaigns may thus commence without delay.

Once promotions are finalized, an alliance-marketing engine may allow promotional campaigns to be delivered to various consumer touch points in real time based on the products purchased during a given transaction. For example, if a consumer purchases qualifying merchandise, an alliance marketing engine may be electronically notified and, in turn, automatically delivers a promotional campaign to the proper consumer touch point. An alliance marketing engine may tally promotional points a consumer is awarded. Upon redemption of these promotional points, that specific consumer account may be correctly debited.

An alliance-marketing engine may also provide a reporting module for use by members of an alliance. Alliance members are able to monitor real-time results of their promotional campaigns via a secure Web-based interface that use drop down menus to create reports. Metrics including but not limited to qualifying purchase conversion rates, promotional campaign redemption rates, point redemption rates, and incremental referral sales may be available for monitoring purposes. Based on these real-time results, alliance members may also be able to modify promotional campaigns. Financial reconciliation of an alliance-marketing fund may be provided at regular intervals (e.g., once per month), and the privacy of alliance members and consumers may be maintained. If a third-party such as a credit-card processor or product manufacturer participates in an alliance-marketing network, access to reports and financial reconcilement would be made available to them. An alliance member's consumers may be able to access their consumer account (via a Web browser, for example) in order to monitor points earned and redeemed.

The drawings describe a specific example of an alliance marketing network that may be deployed in-store. These figures, are extendable to include any number of participating companies, the parameters (business rules) agreed upon between the participating companies, and is extendable to other potential consumer touchpoints.

Figure 2:
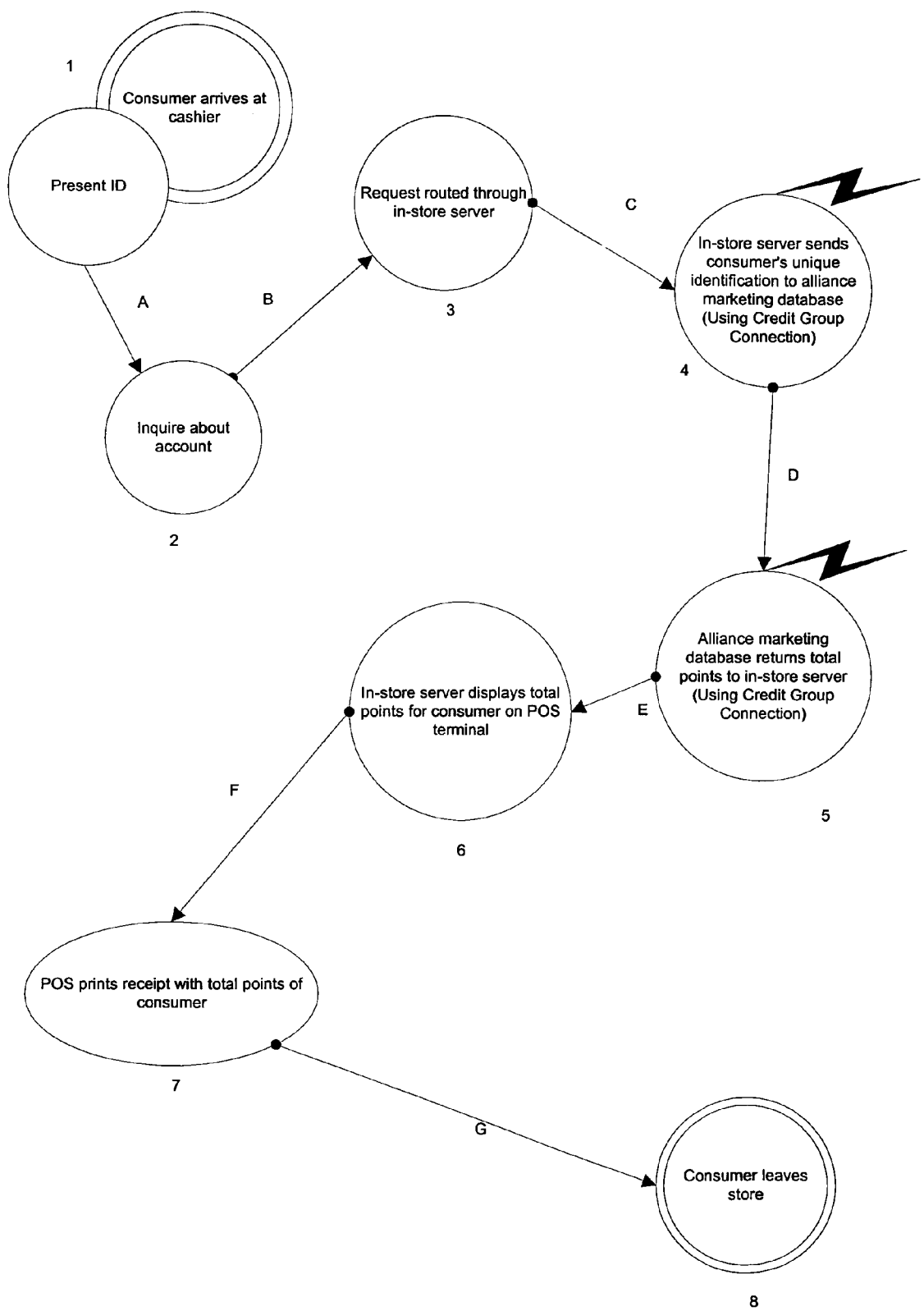
FIG. 2 depicts a typical consumer performing a consumer account inquiry at a point-of-sale terminal at the store of a company participating in an alliance marketing network.
Figure 3:
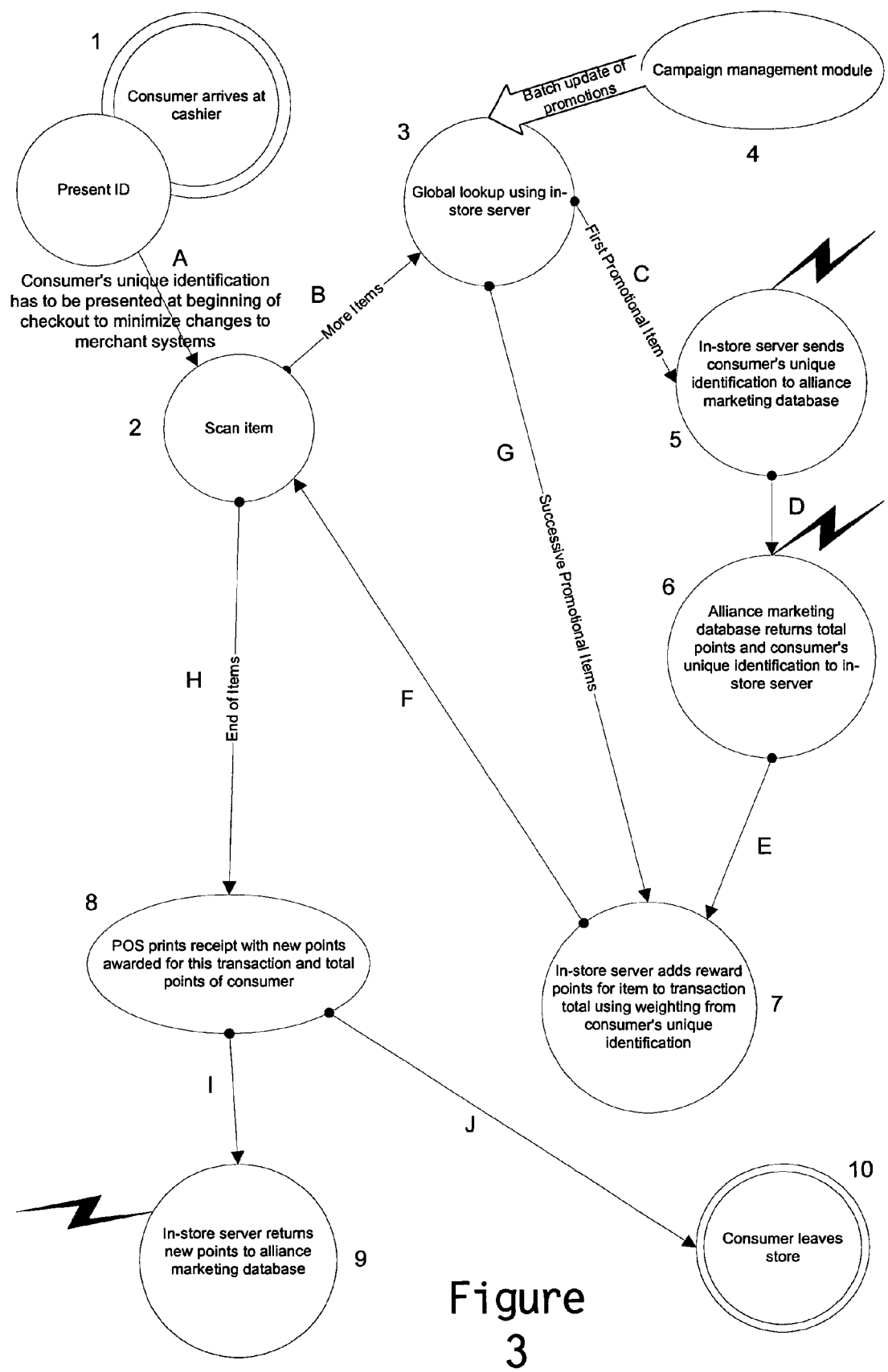
FIG. 3 depicts a consumer purchasing merchandise that results in the award of points.
Figure 4:
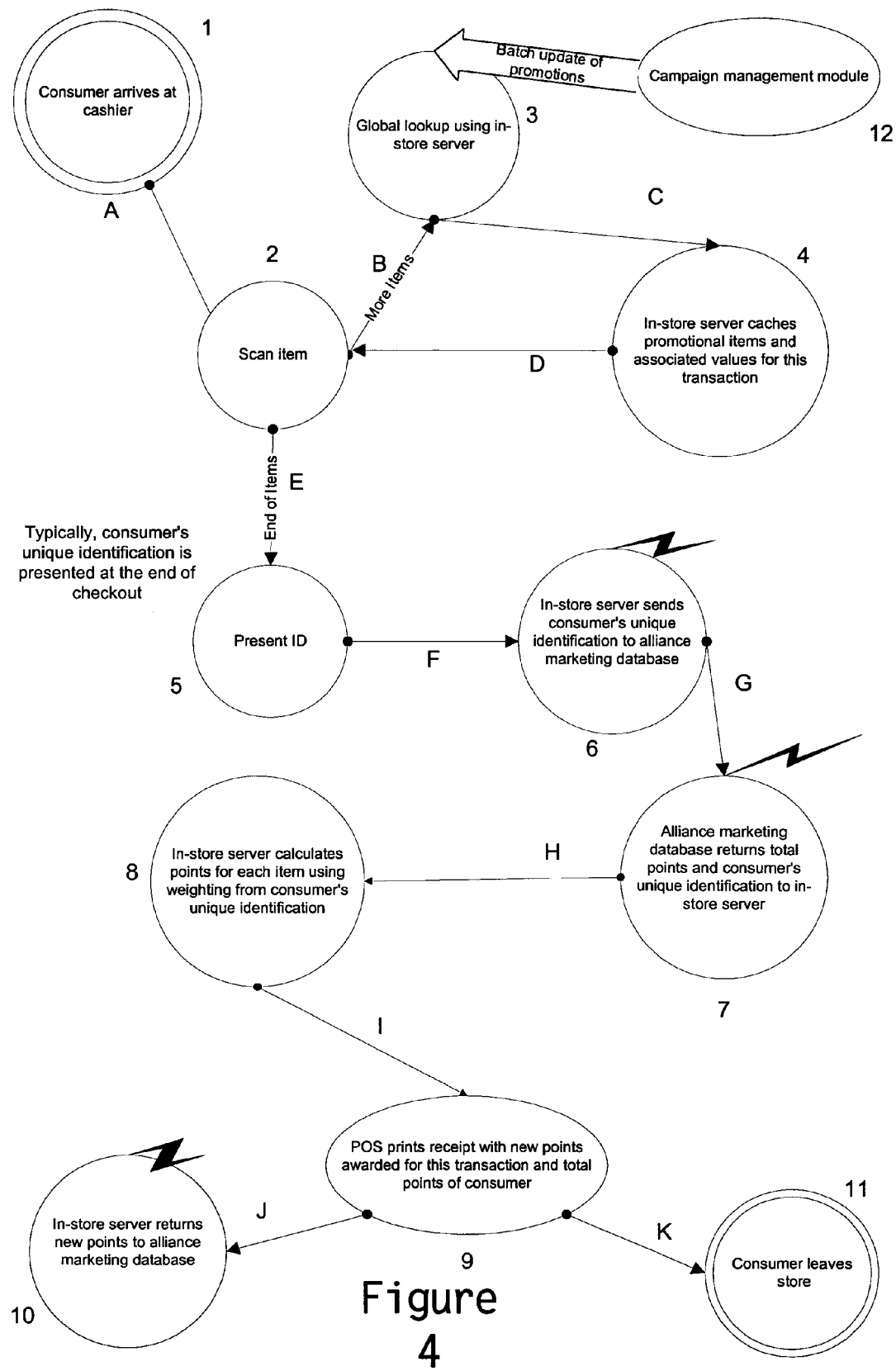
FIG. 4 depicts a consumer purchasing an item that results in the award of points.
Figure 5:
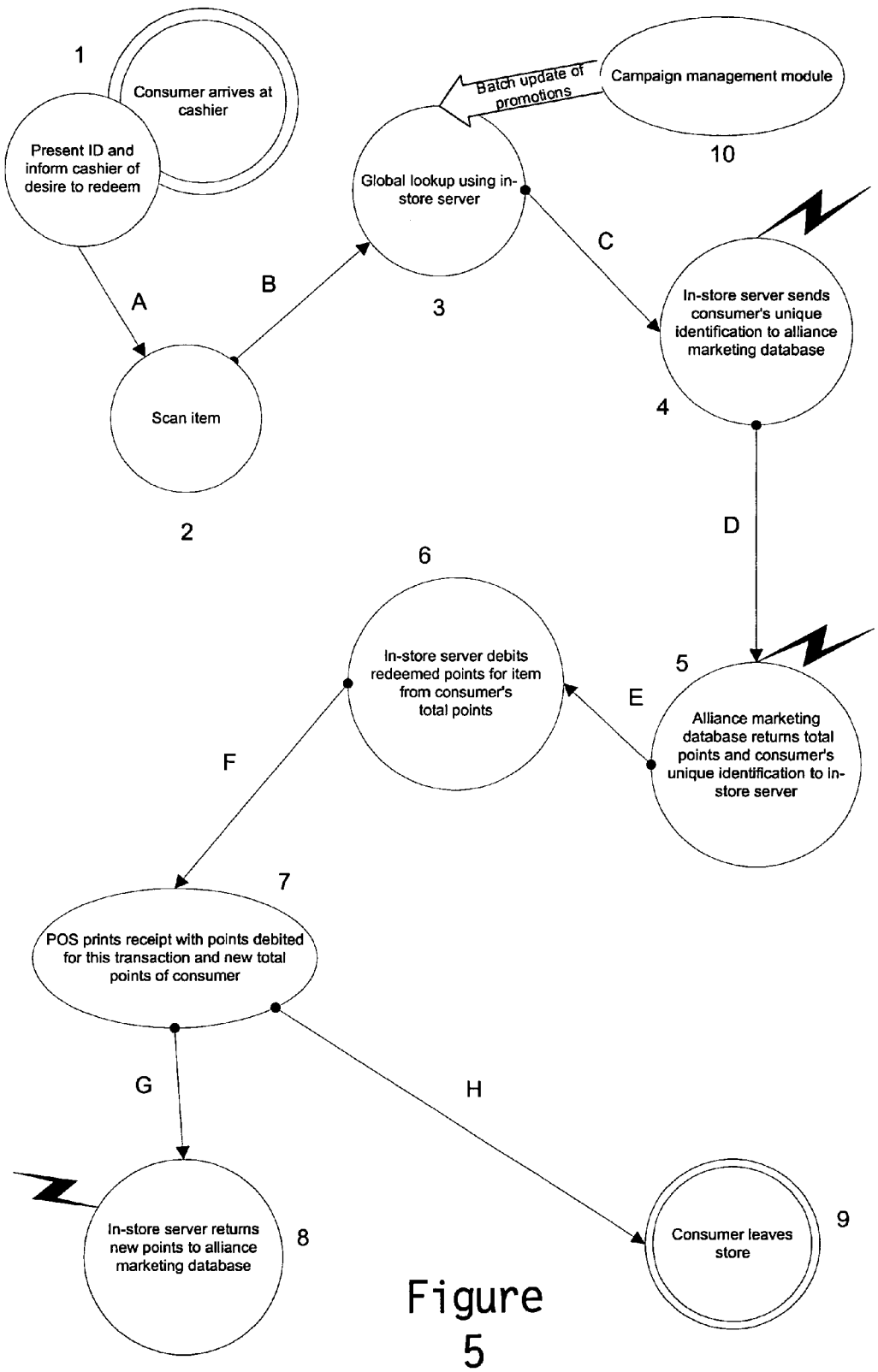
FIG. 5 depicts a consumer redeeming points for free merchandise at an outlet belonging to a company participating in an alliance marketing network.
Figure 6:
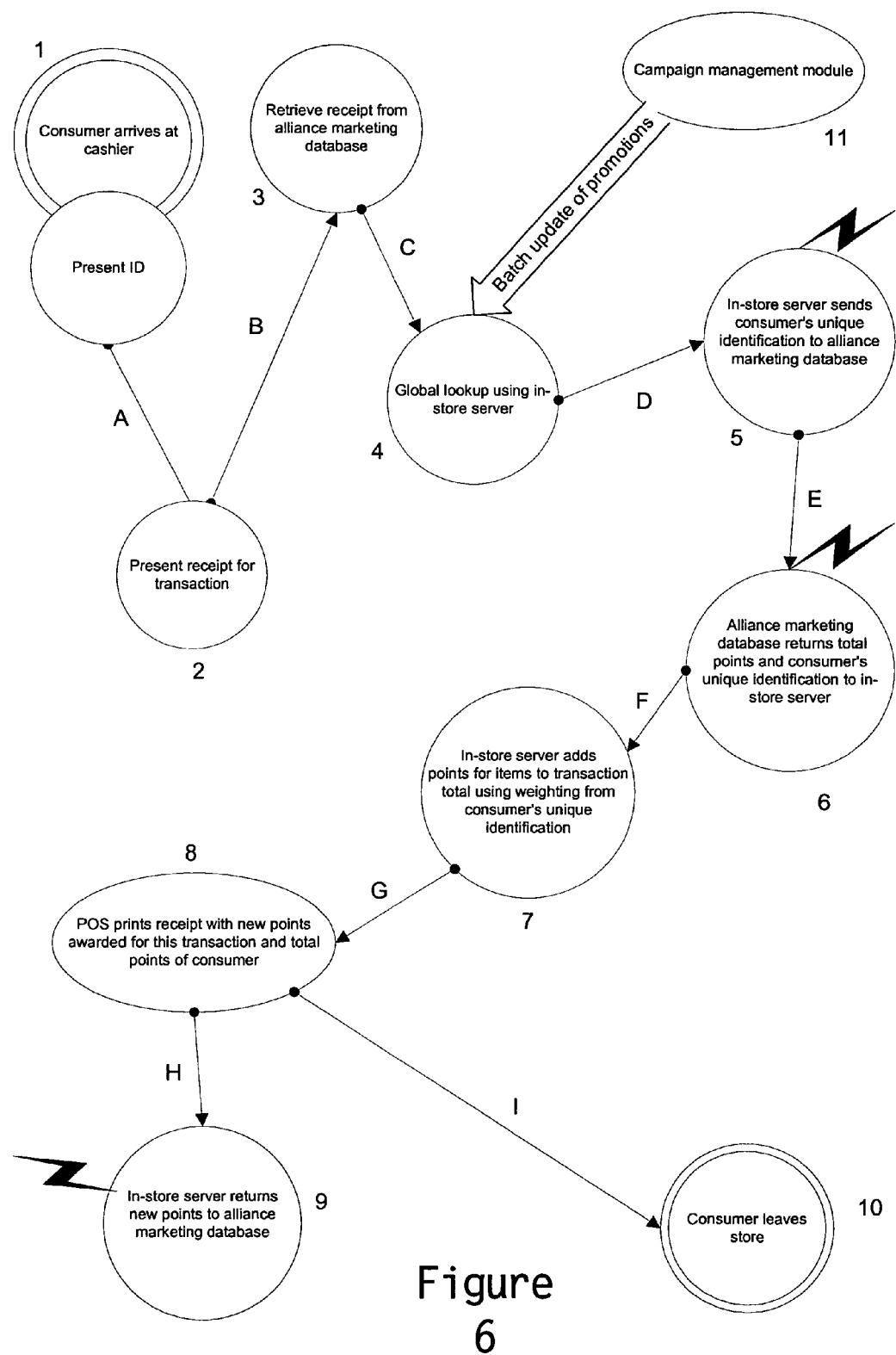
FIG. 6 depicts a consumer returning to a point-of-sale terminal to claim points that were not awarded at the time of purchase.
Figure 7:
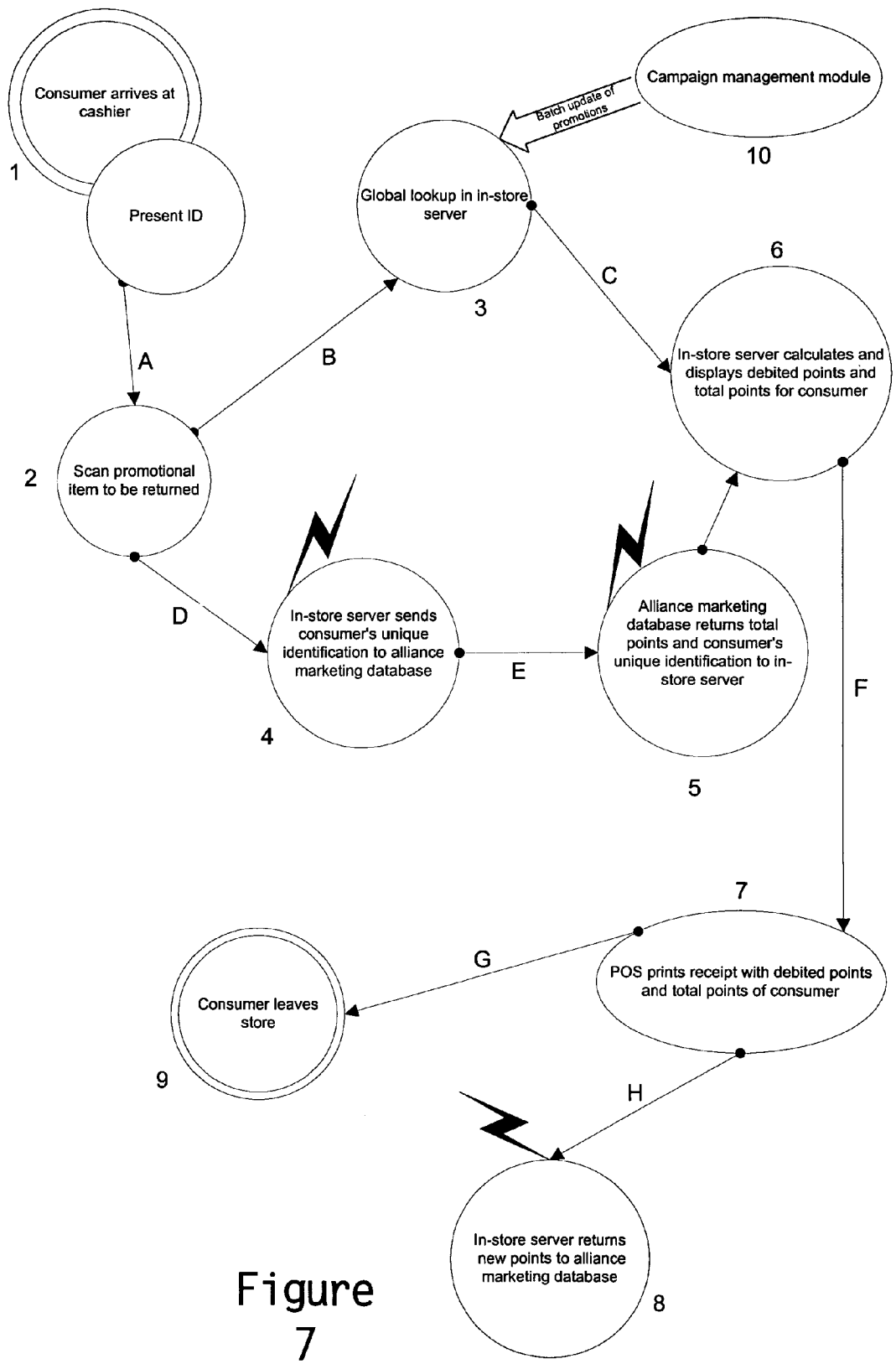
FIG. 7 depicts a consumer returning an item on promotion.
Figure 8:
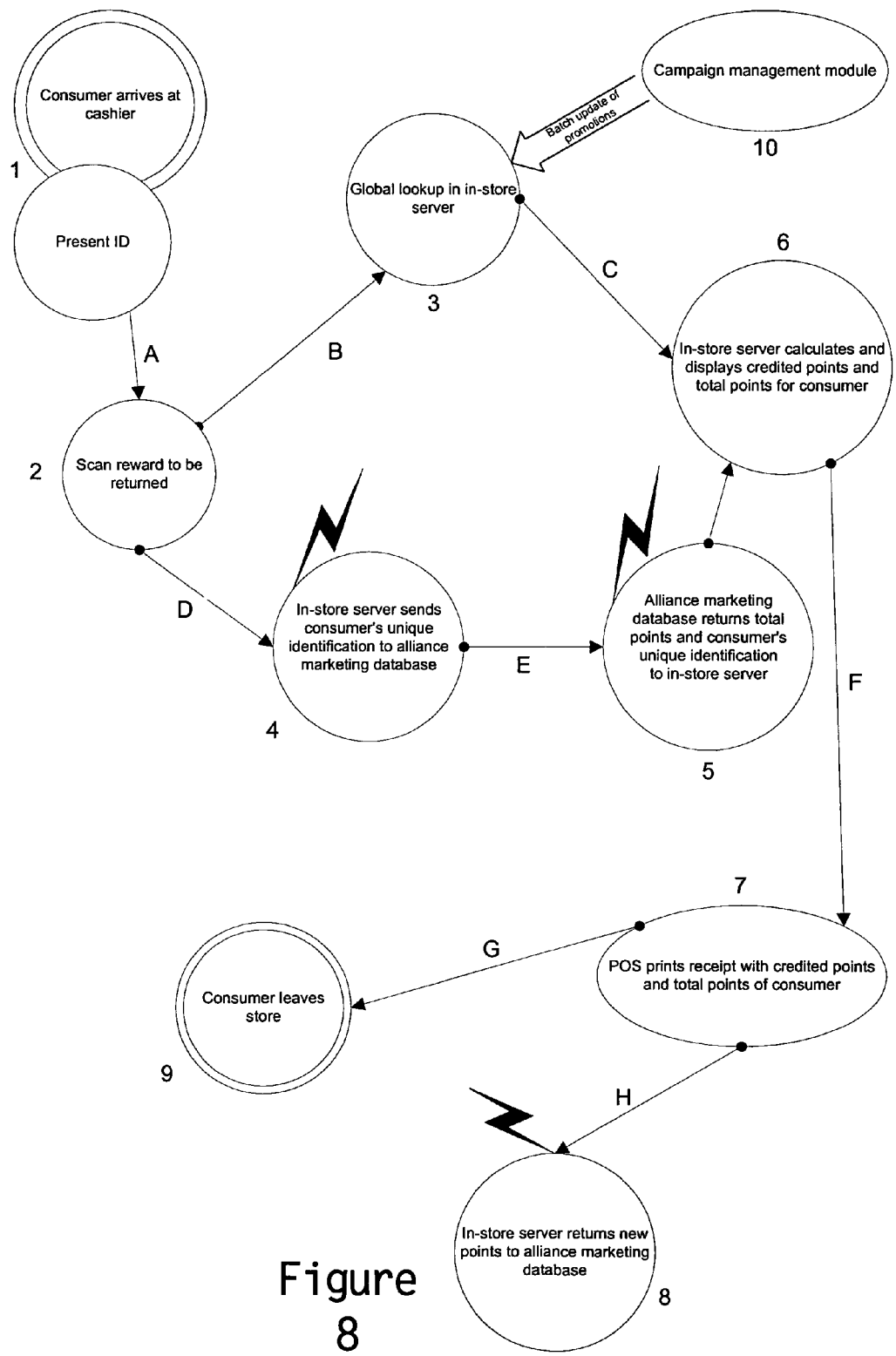
FIG. 8 depicts a consumer returning a redeemed item that was purchased using awarded points.

FIG. 1 depicts a consumer flow between two alliance members (Alliance Member 1 and Alliance Member 2). FIG. 2 depicts a consumer performing a consumer account inquiry at a point-of-sale terminal at the store of a company participating in an alliance marketing network. FIG. 3 depicts a consumer purchasing merchandise that results in the award of points. FIG. 4 depicts a consumer purchasing an item that results in the award of points. FIG. 5 depicts a consumer redeeming points for free merchandise at an outlet belonging to a company participating in an alliance marketing network. FIG. 6 depicts a consumer returning to a point-of-sale terminal to claim points that were not awarded at the time of purchase. FIG. 7 depicts a consumer returning an item on promotion. FIG. 8 depicts a consumer returning a redeemed item that was purchased using awarded points.

FIG. 1 below depicts a consumer flow between two alliance members (Alliance Member 1 and Alliance Member 2). The first step (A) in the flow shows a consumer making a purchase from Alliance Member 1. Data from that purchase may be transferred from Alliance Member 1 in real-time to an alliance marketing engine (B). At this point, line items included in this purchase may be checked to see if any qualify for points. If there are line items that qualify, then those points are transferred to a consumer account (C), as well as, transferred back to the point-of-sale at Alliance Member 1 so that they may be printed on the receipt. Concurrently, a pre-established percentage of the revenue realized from the purchase of qualifying promotional items is automatically recorded to an alliance marketing fund (D). At this point, if the consumer has amassed enough points, he/she may proceed to Alliance Member 2 (F) to redeem these points for the merchandise of his/her choice. Upon checkout at Alliance Member 2, the line items are transferred in real-time to an alliance marketing engine (E). These line items are then examined to verify whether or not that specific consumer account contains sufficient points to qualify for free merchandise. In addition, any other line items purchased during that transaction may also be checked to see if they qualify for additional points. If that consumer account does contain sufficient points to receive free merchandise, those points may then be deducted from that consumer account. This information may then be transferred back in real-time to the point-of-sale at Alliance Member 2. The dollar amount of the merchandise redeemed may be credited to the consumer. Concurrently, a pre-established percentage of the revenue realized from the purchase of qualifying promotional items may be automatically recorded to an alliance marketing fund (D).

FIG. 2 below depicts a typical consumer performing a consumer account inquiry at a point-of-sale terminal at the store of a company participating in an alliance marketing network. The first step (A) in the flow shows a consumer arriving at a cashier in the company's store and presenting their unique identification (1) and inquiring (2) about their consumer account. Step (B) shows the request routed to an in-store server (3) from the point-of-sale terminal. In step (C), this request along with the consumer's unique identification may be packaged by the in-store server and sent to an alliance marketing database (4) (via an existing or dedicated connection provisioned between the company's store and an alliance marketing database, for example). An alliance marketing database may communicate back (D) to the in-store server (5) (using the same connection used for the outbound request). In step (E), the in-store server may send the consumer-account point total to be displayed at the point-of-sale terminal (6). Step (F) shows the consumer account point total being routed to the receipt printer (7) attached to the point-of-sale terminal. Finally, step (G) shows the consumer completing the request and leaving store (8).

FIG. 3 depicts a consumer purchasing merchandise that results in the award of points. In this scenario, the consumer's unique identification is presented at the beginning of the transaction (1) and the cashier enters the unique identifier into the system (A), and then proceeds to scan the items in the shopping basket (2). For each additional item (B), the item information is looked-up at the in-store server (3). If a promotional item is encountered (C), the in-store server sends the consumer's unique identification to an alliance marketing database (5). The task flow can continue through (D) while pertinent data is being retrieved. An alliance marketing database returns (6) the consumer's unique identification and their current points total to the in-store server. Next, the in-store server (7) adds reward points earned by this consumer's purchase to their total points. The point value awarded for the purchase may be dependent on the consumer profile of the purchaser indicated by his/her unique identification. Step (F) includes scanning the next item in the shopping basket. If another item in the basket qualifies for a promotion (2), the logic flow cycles through (G), as re-identification of the consumer is not required within the same transaction. In this case, the flow returns through (F) back to (2) where the scanning of subsequent items takes place. If the shopping basket is empty (H), the point-of-sale terminal proceeds to complete the financial transaction and then prints out the new points awarded to the consumer from this transaction, as well as, the total points in the consumer account (8) at the bottom of the receipt. Finally, the in-store server (9) sends a message with the new points accumulated by the consumer back to an alliance marketing database, along with any campaign related data that is needed for reconciliation of an alliance marketing network. As a background process, a campaign management module (4) sends periodic batch updates to the in-store server.

FIG. 4 depicts the consumer purchasing an item that results in the award of points. In this scenario, the consumer's unique identification is presented at the end of the transaction, instead of the beginning as in the previous scenario. The consumer arrives at the point-of-sale terminal (1) and the cashier proceeds to scan the items in the shopping basket (2). For each item (B), the promotional information is looked-up at the in-store server (3). The in-store server caches promotional items and their associated values (4) and the flow returns (D) to scan the next item (2).

If more items are encountered step (B) is repeated and the cycle continues. When all items in a shopping basket have been scanned (E), the consumer presents his/her unique identification (5) to the cashier. The in-store server then transmits the consumer's unique identification to an alliance marketing database (6). An alliance marketing database returns (7) the consumer's unique identification and their current point total to the in-store server. Next, the in-store server (8) adds points awarded due to each cached promotional item to the total for the transaction. The point value awarded for the purchase may be dependent on the consumer profile of the purchaser indicated by his/her unique identification. The point-of-sale terminal proceeds to complete the financial transaction and then prints the new points awarded to the consumer from this transaction, as well as, the total points in the consumer account (9) at the bottom of the receipt. Finally, the in-store server (10) sends a message with the new points accumulated by the consumer back to an alliance marketing database, along with any campaign related data that is needed for reconciliation of an alliance marketing network. As a background process, a campaign management module (12) sends periodic batch updates to the in-store server.

FIG. 5 depicts a consumer redeeming points for free merchandise at an outlet belonging to a participating company. The consumer's unique identification is presented (1) and the free merchandise chosen is scanned (2). The in-store server retrieves the description for the item from lookup tables (3) and also queries an alliance marketing database (4) for consumer account information. An alliance marketing database returns the consumer profile of the purchaser indicated by his unique identification along with the points required for this redemption, and the total points in the consumer account (5). The in-store server calculates the points required for the free merchandise and debits this value from the consumer's total points (6). In step (7), the point-of-sale terminal prints out the points used in this redemption and the new total points at the bottom of the receipt. In step (8), the in-store server updates the consumer account point total in an alliance marketing database.

FIG. 6 depicts a consumer returning to a point-of-sale terminal to claim points that were not awarded at the time of purchase. The consumer arrives at the point-of-sale terminal (1) and presents his/her unique identification. The consumer also presents the receipt containing the items that did not receive the required points (2). The in-store server then retrieves an electronic receipt from an alliance marketing database (3). The in-store server processes the electronic receipt (4) and caches promotional items and their associated values. The in-store server then sends the consumer's unique identification to an alliance marketing database (5). An alliance marketing database returns (6) the consumer profile of the purchaser (indicated by his/her unique identification) along with their current point total to the in-store server. Next, the in-store server (7) adds the points earned by each cached item to the total for the transaction. The point value awarded for the purchase may be dependent on the consumer profile of the purchaser indicated by his/her unique identification. The point-of-sale terminal proceeds to complete the financial transaction and then prints out the new points awarded to the consumer due to this transaction, as well, total points in the consumer account (8) at the bottom of the receipt. Finally, the in-store server (9) sends a message with the new points accumulated by the consumer back to an alliance marketing database, along with any campaign related data that is needed for reconciliation of an alliance marketing network. As a background process, a campaign management module (11) sends periodic batch updates to the in-store server.

FIG. 7 depicts the consumer returning an item on promotion. In this scenario, the consumer's unique identification is presented at the beginning of the transaction (1) and the cashier enters the unique identifier into the system (A) and then proceeds to scan the promotional item to be returned (2). The item's information is looked-up at the in-store server (3) and the in-store server sends the consumer's unique identification to an alliance marketing database (4). For the purpose of efficiency, both of these tasks occur in parallel. An alliance marketing database returns (5) the consumer's unique identification and their current point total to the in-store server. Next, the in-store server (6) debits the points earned by this line item from the consumer's point total in his/her consumer account. The point value debited for this return may be dependant on the consumer profile of the purchaser indicated by his/her unique identification. The point-of-sale terminal proceeds to complete the financial transaction and then prints out the points debited from the consumer due to this transaction, as well as the total points in the consumer account (7) at the bottom of the receipt. Finally the in-store server (8) sends a message with the new point total for the consumer back to an alliance marketing database, along with any campaign related data that is needed for reconciliation of an alliance marketing network. As a background process, a campaign management module (10) sends periodic batch updates to the in-store server.

FIG. 8 depicts a consumer returning a redeemed item that was purchased using awarded points. In this scenario the consumer's unique identification is presented at the beginning of the transaction (1); the cashier enters the unique identifier into the system (A) and then proceeds to scan the item to be returned (2). The awarded item's information is looked up at the in-store server (3) and the in-store server sends the consumer's unique identification to an alliance marketing database (4). For the purpose of efficiency, both tasks occur in parallel. An alliance marketing database returns (5) the consumer's unique identification and their current point total to the in-store server. Next, the in-store server (6) credits the points used by the award of this line item from the consumer's point total in his/her consumer account. The point value credited for this return may be dependent on the consumer profile of the purchaser indicated by his/her unique identification. The point-of-sale terminal proceeds to complete the financial transaction and then prints out the points credited to the consumer due to this transaction, as well as, the total points in the consumer account (7) at the bottom of the receipt. Finally, the in-store server (8) sends a message with the new point total for the consumer back to an alliance marketing database, along with any campaign related data that is needed for reconciliation of an alliance marketing network. As a background process, a campaign management module (10) sends periodic batch updates to the in-store server.

Herein is taught an inter-company network designed to foster consumer loyalty among participants. In various embodiments, the invention provides a real-time automated points-based currency utilized in conjunction with various consumer transaction touch points. The invention leverages line item detail, form of payment, sales channel, etc. to create and implement customized campaigns. Consumer behavior and spending patterns may thus be influenced. Activities may be tracked and relevant parties compensated based on those activities.

The invention now being fully described, one of ordinary skill in the art will readily recognize many changes and modifications that can be made thereto without departing from the spirit of the appended claims. For example, while the above examples describe inter-company alliances, intra-company alliances are also possible. The shoe department of a company and the sock department of the same company may strike an alliance.

What is claimed is:

1. A method for cross marketing products between a first company and a second company engaged in a bilateral cross-marketing relationship, the method performed over an interconnected plurality of point-of-sale terminals and a server, and comprising the steps of:

establishing a parameter of the cross-marketing relationship by mutual consent of the first and second companies, the parameter including a discount on a second product offered by the second company, the discount contingent upon a condition at least partially satisfied by a purchase of a first product offered for sale by the first company;

at the first company, identifying a straight sale that includes the purchase of the first product by a particular consumer at a first point-of-sale terminal, granting the discount and storing an indication of the purchase of the first product in a database on the server;

at the second company, receiving a request from the particular consumer for the second product, querying the database to determine that the particular consumer has purchased the first product from the first company, providing the discount on the second product, and updating the database to reflect the providing;

based on the first product being a cross-marketed product, calculating and recording an amount of cross-marketing revenue realized from a predetermined portion of the cost of the straight sale to a marketing fund account in the database; and based on the providing of the discount, allocating at least a portion of the cross-marketing revenue and a predetermined portion of the cost of the discount in the fund to reimburse the second company for the discount.

2. The method of claim 1, wherein the discount is a 100 percent discount.

3. The method of claim 1, wherein the discount is less than 100 percent.

4. The method of claim 1, wherein the granting comprises:
crediting an account of the consumer with the discount.

5. The method of claim 1, further comprising the step of:
notifying the consumer of the discount.

6. The method of claim 1, further comprising the steps of:
establishing a further parameter of a cross-marketing relationship between a third company and the second company by mutual consent of the second and third companies, the further parameter including a second discount on the second product, the second discount contingent upon a condition at least partially satisfied by a purchase of a third product offered for sale by the third company; and at the second company, standing ready to provide the first and second discounts.

7. A method for cross marketing products between a first company and a second company engaged in a bilateral cross-marketing relationship, the method performed over an interconnected plurality of electronic sales terminals and a server, and comprising the steps of:

establishing a parameter of the cross-marketing relationship by mutual consent of the first and second companies, the parameter including a discount on a second product offered by the second company, the discount contingent upon a condition at least partially satisfied by a purchase of a first product offered for sale by the first company;

at the first company, recognizing a straight sale that includes the purchase of the first product at one of the plurality of electronic sales terminals by a consumer and granting the discount;

crediting an account of the consumer maintained at the server with the discount;

notifying the consumer of the discount; and based on a providing of the discount to the consumer, depositing a predetermined amount of money into a marketing fund account maintained at the server for the benefit of the second company in at least partial compensation for providing the discount; and at the second company, receiving a request from the consumer for the second product, and standing ready to provide the discount, wherein the amount of money deposited into the marketing fund account includes a predetermined percentage of revenue realized from the purchase of the first product and a predetermined percentage of the cost of the discount.

8. The method of claim 7, further comprising the steps of:
establishing a further parameter of a cross-marketing relationship between a third company and the second company by mutual consent of the second and third companies, the further parameter including a second discount on the second product, the second discount contingent upon a condition at least partially satisfied by a purchase of a third product offered for sale by the third company; and at the second company, selling the second product, and providing the discount and the second discount.

9. A method for cross marketing products between a first department and a second department at a company using an electronic sales terminal and a server coupled by an electronic communications link, wherein the first and second departments are engaged in a bilateral cross-marketing relationship, the method comprising the steps of:

establishing a parameter of the cross-marketing relationship by mutual consent of the first and second departments, the parameter including a discount on a second product offered by the second department, the discount contingent upon a condition at least partially satisfied by a purchase of a first product offered for sale by the first department;

at the first department, recognizing a straight sale that includes the purchase of the first product at a first one of a plurality of sales terminals by a consumer and granting the discount;

crediting an account of the consumer maintained on the server with the discount;

notifying the consumer of the discount;

based on a providing of the discount to the consumer, depositing a predetermined amount of money into a marketing fund account maintained on the server for the benefit of the second department in at least partial compensation for providing the discount; and at the second department, receiving a request from the consumer for the second product, and standing ready to provide the discount at the same or a different one of the plurality of sales terminals on the second product, wherein the money deposited into the marketing fund account for the benefit of the second department amounts to a predetermined percentage of revenue realized from the purchase of the first product and a predetermined percentage of the cost of the discount.

10. A method for cross marketing products between a first company and a second company engaged in a bilateral cross-marketing relationship, the method performed over an interconnected plurality of point-of-sale terminals and a server, and comprising the steps of:

establishing a parameter of the cross-marketing relationship by mutual consent of the first and second companies, the parameter including a discount on a second product offered by the second company, the discount contingent upon a condition at least partially satisfied by a purchase of a first product offered for sale by the first company; and at the first company:
identifying a straight sale that includes the purchase of the first product by a particular consumer at a first point-of-sale terminal;
sending first purchase data identifying at least the first product from the first point-of-sale terminal in substantially real-time to the server;
determining at the server that the first purchase data identifies a cross-marketed product for which the parameter has been established;
based on the first product being a cross-marketed product, granting a promotional discount value to an account associated with the particular consumer, the promotional discount value contributing towards satisfying the discount condition;
providing an indication of the promotional discount value on a receipt issued to the consumer for the straight sale; and
recording an amount of cross-marketing revenue realized from the straight sale to a marketing fund account, wherein the marketing fund account is structured to defray the second company's costs in dispensing products in conjunction with a first promotional discount value earned by the purchase of the first company's products, and the first company's costs in dispensing products in conjunction with a second promotional discount value earned by the purchase of the second company's products.

11. The method in claim 10, wherein the server further includes a marketing engine.

12. The method in claim 10, further comprising:
identifying a purchase of the second product by the particular customer from the second company at a second point-of-sale terminal;
sending second purchase data identifying at least the second product from the second point of sale terminal in substantially real-time to the server;
comparing the particular customer account's stored promotional discount value with a redemption threshold on the server, the threshold value satisfying the condition; and if the consumer account's stored promotional discount value is at least equal to the threshold value, then permitting the consumer to redeem the discount.

13. The method in claim 10, wherein the promotional discount value comprises a predetermined number of award points.

14. The method in claim 10, wherein the amount recorded into the marketing fund comprises a predetermined percentage of the revenue realized from the straight sale.

15. The method as in claim 10, further including receiving a consumer account inquiry from a consumer at a point-of-sale terminal at the store of a company participating in the cross-marketing.

16. The method as in claim 10, further comprising receiving a consumer's unique identification number at the beginning of a sales transaction or a consumer account inquiry transaction.

17. The method as in claim 10, wherein the server is an in-store server.

18. The method as in claim 10, wherein the server comprises an out-of-store external server.

19. The method as in claim 1, wherein if a further product is purchased from the second company in combination with the providing of the discount, a predetermined portion of the cost of the further product is contributed to the marketing find account for the benefit of the first company, the purchase of the further product constituting an incremental referral sale.

20. The method as in claim 7, wherein if a further product is purchased from the second company in combination with the providing of the discount, a predetermined portion of the cost of the further product is contributed to the marketing find account for the benefit of the first company, the purchase of the further product constituting an incremental referral sale.

21. The method as in claim 9, wherein if a further product is purchased from the second company in combination with the providing of the discount, a predetermined portion of the cost of the further product is contributed to the marketing fund account for the benefit of the first company, the purchase of the further product constituting an incremental referral sale.

22. The method as in claim 10, wherein if a further product is purchased from the second company in combination with the providing of the discount, a predetermined portion of the cost of the further product is contributed to the marketing find account for the benefit of the first company, the purchase of the further product constituting an incremental referral sale.

\* \* \* \* \*

UNITED STATES PATENT AND TRADEMARK OFFICE
CERTIFICATE OF CORRECTION

PATENT NO. : 7,324,962 B1  Page 1 of 1
APPLICATION NO. : 09/899369
DATED : January 29, 2008
INVENTOR(S) : Valliani et al.

It is certified that error appears in the above-identified patent and that said Letters Patent is hereby corrected as shown below:

In Column 1, Line 10, after "as inventors," delete "with and".

In Column 4, Line 37, insert -- q1j --, before "is the quantity".

In Column 14, Line 29, in Claim 19, delete "find" and insert -- fund --, therefor.

In Column 14, Line 36, in Claim 20, delete "find" and insert -- fund --, therefor.

In Column 14, Line 51, in Claim 22, delete "find" and insert -- fund --, therefor.

Signed and Sealed this

Twenty-first Day of September, 2010

David J. Kappos
*Director of the United States Patent and Trademark Office*